No. 732,130. PATENTED JUNE 30, 1903.
E. A. SPERRY.
SYSTEM OF CONTROL FOR ELECTRICALLY PROPELLED TRAINS.
APPLICATION FILED SEPT. 14, 1898. RENEWED JULY 18, 1900.
NO MODEL. 5 SHEETS—SHEET 1.

FIG. 1.

WITNESSES.
A. H. Abell.
A. F. Macdonald.

INVENTOR.
Elmer A. Sperry
by Albert G. Davis
Atty.

No. 732,130. PATENTED JUNE 30, 1903.
E. A. SPERRY.
SYSTEM OF CONTROL FOR ELECTRICALLY PROPELLED TRAINS.
APPLICATION FILED SEPT. 14, 1898. RENEWED JULY 18, 1900.

NO MODEL. 5 SHEETS—SHEET 2.

WITNESSES.
A. H. Abell.
A. F. Macdonald.

INVENTOR.
Elmer A. Sperry,
by Albert G. Davis
Atty.

No. 732,130. PATENTED JUNE 30, 1903.
E. A. SPERRY.
SYSTEM OF CONTROL FOR ELECTRICALLY PROPELLED TRAINS.
APPLICATION FILED SEPT. 14, 1898. RENEWED JULY 18, 1900.
NO MODEL. 5 SHEETS—SHEET 3.

WITNESSES.
A. H. Abell.
A. F. Macdonald.

INVENTOR.
Elmer A. Sperry,
by Albert G. Davis
Atty.

No. 732,130. Patented June 30, 1903.

UNITED STATES PATENT OFFICE.

ELMER A. SPERRY, OF CLEVELAND, OHIO, ASSIGNOR TO THE GENERAL ELECTRIC COMPANY, A CORPORATION OF NEW YORK.

SYSTEM OF CONTROL FOR ELECTRICALLY-PROPELLED TRAINS.

SPECIFICATION forming part of Letters Patent No. 732,130, dated June 30, 1903.

Application filed September 14, 1898. Renewed July 18, 1900. Serial No. 24,093. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Systems of Control for Electrically-Propelled Trains, of which the following is a specification.

My invention relates to the control of electric motors which are mounted on separate vehicles and the several vehicles united mechanically.

In order to give a quick even acceleration to a number of mechanically-united vehicles forming a train, it is preferable to divide the motive force into a number of units and to distribute the units over the several vehicles forming the train. This arrangement is preferable to using a single locomotive, for it permits the utilization for tractive purposes of the weight of each car on the train. In running trains for suburban or elevated service the cars are heavily loaded both night and morning, while the traffic during the remainder of the day is comparatively light. Where a single locomotive is used for each train, it must necessarily be of sufficient power to handle the train when heavily loaded. This necessitates providing a locomotive largely in excess of what is required for light-load service. By dividing the motive force into a number of separate units and placing the units on different cars on the train a system is provided which is flexible to the greatest degree, for each car is capable of taking care of its own load. If the motors on the train are sufficiently powerful, one or more trail-cars having no motors may be added to the train. In a system of this kind it is necessary to control all of the motors simultaneously and correspondingly from a selected point on the train; otherwise the motor or motors of one car will be doing an amount of work differing from that of the motor or motors of another car.

My invention is especially intended for use in connection with electric railways; but it is applicable for use in connection with canal-boats, merchandise-conveyers, or elevators, either where it is desired to control a number of separate boats or vehicles or where it is desired to control a single boat or vehicle from a selected point. It is applicable for use in connection with steering apparatus for vessels and also in connection with other systems of control for electric motors wherever it is necessary to control one or more motors from a selected point or from any one of a number of such points.

My invention therefore has for its objects to provide a system of control for electric motors which is so arranged that the motors may be simultaneously controlled from a selected point or any number of such points, and, further, to provide a system of control for electric motors which is so arranged that the number of motors in circuit may be varied without impairing the operation of the system.

In carrying out my invention as applied to electric railways I find it best to make each car or vehicle a self-contained unit—that is to say, each car has its own motor or motors, contact device, controller, and what I term a "master-controller," as it is employed to regulate the action of the motor-controller. The various devices above referred to are connected to a cable, and when the vehicles are united to form a train the ends of the cables are united in such manner that corresponding wires are connected. The master-controllers are connected to the cable in multiple and are so arranged that any one of them may be employed to regulate the speed of the train through the medium of the motor-controllers. The motor-controllers should be so arranged that they change the resistance of the motor-circuits and also the grouping of the motors, though my invention is applicable to the control of a single motor. In addition to controlling the motors while driving the load the motor-controllers are employed to regulate the motors when they are acting to brake the load. Since the motor-controllers are regulated by electrical means and since the source of supply derived from a conductor situated along the line of travel is subject to interruptions, I prefer to employ a separate source of power for the regulating means, so that the action of the controllers may be controlled independent of the condition of the external circuit.

In the accompanying drawings, which show an embodiment of my invention, Fig. 5$^a$ is a plan view of the same with the position of the parts altered.

Figure 1:
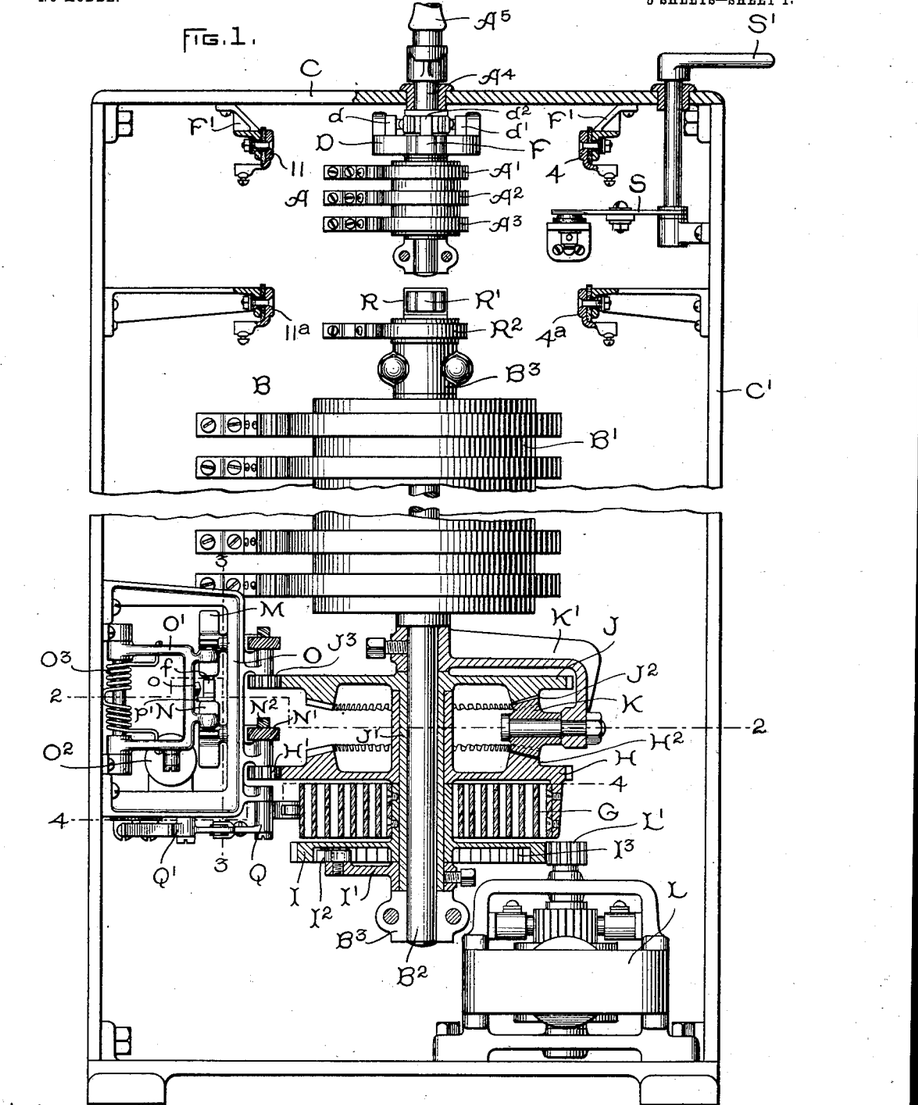
Figure 1 is a front elevation, partially in section, of a controller.

Mounted on each motor-car is a master-controller A and a motor-controller B, Fig. 1. In the present instance these are shown as being mounted within a common case C; but, if desired, they may be separated and mounted in any suitable manner. The master-controller consists of a cylinder having three contact-rings A′, A$^2$, and A$^3$ mounted thereon, and making contact with these rings are three stationary brushes. The cylinder is mounted for rotation on the shaft A$^4$, which is provided with suitable bearings and is actuated by the handle A$^5$.

Loosely mounted on the shaft A$^4$ is a frame D, (best shown in Figs. 1 and 6,) which carries three contacts $d$, $d'$, and $d^2$. The contacts $d$ and $d'$ are in electrical connection with each other; but contact $d^2$ is insulated from the other contacts and also from the frame and is connected to contact-ring A′. Mounted on opposite sides of the frame are two adjusting-screws D′ and D$^2$. These screws are engaged by the arm E, which is keyed to the shaft A$^4$ when it is desired to actuate the controller, thus forming a lost-motion connection between the operating-handle and the operative parts of the controller.

Mounted on springs on the arm E are two contacts $e$ and $e'$, which are maintained in engagement either with the contacts $d$ and $d^2$ or $d'$ and $d^2$, depending upon which way the arm is moved. Mounted on the outside of the frame is a spring-pressed contact F, arranged to establish electrical connection with the several fixed contacts 1 to 13, inclusive. Contacts 1 to 7, inclusive, form one set employed for braking, and contacts 8 to 13, inclusive, form a second set employed for power purposes. The fixed contacts are supported by brackets F′ from the cap-plate C, as shown in Fig. 1, and are arranged in the form of a circle, and as the contact F moves over them current flows to a corresponding set of contacts 1$^a$ to 13$^a$, inclusive, similar contacts being given similar reference-numerals, but with different exponents—as, for example, contact 1 is connected to contact 1$^a$, and so on.

Figures 7, 8:
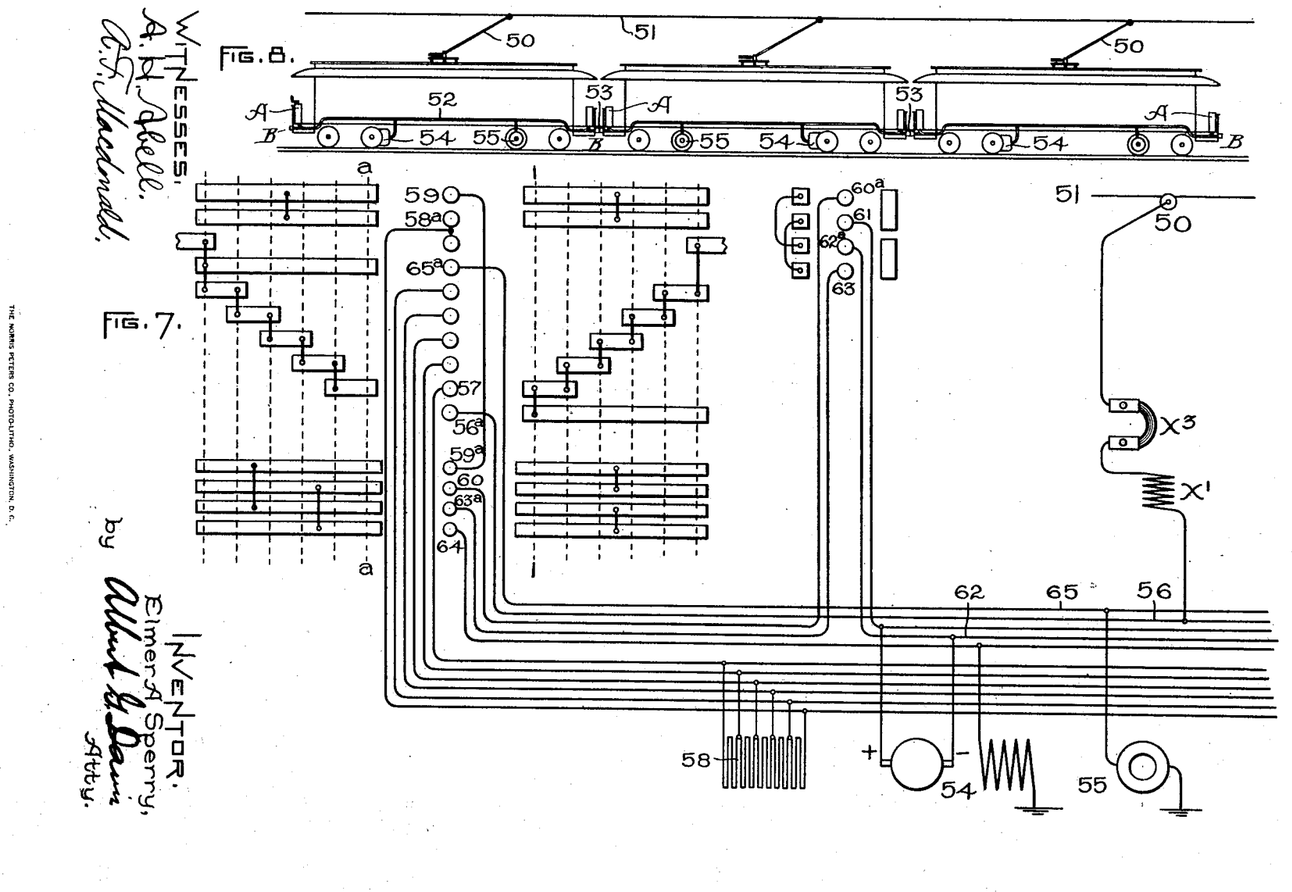
Fig. 7 is a diagram of the circuits of the motor-controller.
Fig. 8 is a diagrammatic representation of a three-car train.

The motor-controller is provided with a contact-cylinder B′, which is mounted for oscillating movement on a shaft B$^2$, carried by bearings B$^3$, stops (not shown) being provided for limiting its motion in either direction. The cylinder is provided with a plurality of contacts which are arranged as shown in Fig. 7, the set of contacts located on the right-hand side of the fixed vertically-disposed row of brushes being employed for power purposes and the set of contacts located on the left of said brushes for braking purposes. The cylinders of the master and motor controllers are so arranged, as will be shown hereinafter, that they move synchronously in a step-by-step manner, and the angular position of the master operating-handle A$^5$ indicates by its angular position the position of the cylinder of the motor-controller, the advantage of which will be hereinafter set forth. For convenience I have shown the master and motor controllers mounted within the same casing; but it is evident that they may be disposed with respect to each other in any desired manner.

The cylinder of the motor-controller is actuated both forward and back by means of a spring pilot-motor which consists of a spiral spring so arranged that it tends to unwind from both ends. In order to restore energy to the spring, a small electric motor is provided which is arranged to automatically start into operation as soon as the spring unwinds to a certain extent.

Figure 2:
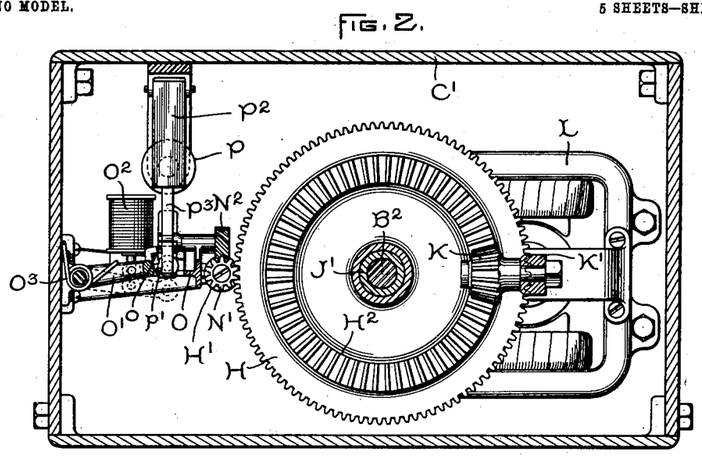
Fig. 2 is a section taken on line 2 2 of Fig. 1.
Figure 4:
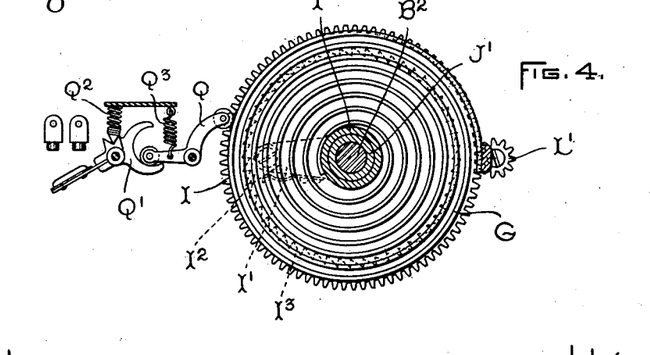
Fig. 4 is a section taken on line 4 4 of Fig. 1.

Referring to Figs. 1, 2, and 4 of the drawings, the spring G, constituting the propelling force or pilot-motor for the cylinder B′, is secured at its outer end to a lug on the inner side of the bevel-gear H and is secured at the inner end to the hub of the combined ratchet and gear I, which in turn is loosely mounted on the sleeve J′ of the gear J. The gear J is loosely mounted on the shaft B$^2$. Meshing with the gear J is a pinion J$^3$, forming a part of the governing device, to be hereinafter described. On the under side of the gear J is cut a bevel-gear J$^2$, and meshing therewith is a pinion K, which is carried by an arm K′, the said arm being rigidly secured to the controller-shaft B$^2$. Rigidly attached to the sleeve J′ of the gear is an arm I′, carrying at its outer end a spring-pressed pawl I$^2$, arranged to engage with the ratchet-teeth I$^3$, formed on the inside of the gear I. Meshing with the gear I is a pinion L′, carried by the armature-shaft of the spring winding-motor L. Meshing with the spur-gear H is a pinion H′, forming a part of the governing device, to be hereinafter described. On the upper side of the gear H is cut a bevel-gear H$^2$, which is arranged to mesh with the pinion K, carried by the arm K′.

To regulate the action of the spring-motor, two governing devices or escapements are provided. Since they are similar in construction, only one of them will be described. Meshing with the gear H is a pinion H′, and mounted on the same shaft with the pinion is a skew-gear N′, which meshes with a similar skew-gear N$^2$. Rigidly mounted on the shaft with the skew-gear N$^2$ is a wheel N, having a number of radially-extending arms. In the present instance four arms are shown; but the number can be varied as desired.

Mounted in a frame secured to the back of the controller-casing are two magnets P and P'. These magnets are situated on opposite sides of a polarized armature $P^2$, and the direction of current flowing through their energizing-coils determines the position of the armature. The armature is provided with an extension $P^3$, having lugs $p$, which engage with one or the other of the armed wheels N and M, according to the position of the armature, and arrest its movement.

Secured to the left-hand side of the controller-casing is a rectangular frame O, which supports the several skew-gears and also the armed wheels. Mounted within the frame O is a U-shaped pivoted lever O', arranged to move into engagement with the armed escapement-wheels when it is desired to check their movement and also that of the cylinder B' and out of engagement when it is desired to permit the wheels and also the cylinder to move. The lever is normally held out of engagement with the wheels by the spiral spring $O^3$ and is brought into operative position by the solenoid-magnet $O^2$. In addition to controlling the action of the wheels the lever O' is arranged to hold the armature $P^2$ in whichever position it may happen to be when the magnet $O^2$ is deënergized. This is accomplished by casting a small V-shaped boss $o$ on the lever O', which is so arranged that it will when moved to its normal position by the spring $O^3$ engage the pin $p'$ on the back of the armature extension $P^3$ and force the armature to remain in the position which it last occupied, the arrangement and bevel of the boss being such that it will move the armature in the proper direction.

The coils P, P', and $O^2$ are connected in series, and while the direction of current in coils P and P' determines the direction of movement of the armature $P^2$ the magnet $O^2$ being a solenoid will attract its core without regard to the direction of current.

In view of the necessity of having the controller in readiness for instantaneous operation I prefer to render the winding of the spring-motor G automatic, thereby taking the responsibility away from the motorman. To accomplish this, an electric motor is provided, the circuit of which is controlled by a switch so arranged that when the spring unwinds to a certain degree it will close and after the spring is rewound will open.

Referring to Fig. 4, G represents the spring-motor, and pivotally supported at one side thereof is a lever Q, carrying rollers at its ends, one roller bearing on the spring G and the other roller bearing on the switch Q'. The switch is pivotally supported, and is maintained either in the open or closed position by the spring $Q^2$, which is arranged to work over a dead-center. As the motor-spring G unwinds it expands, so that the lever Q is gradually rotated around its center until the spring $Q^2$ passes the dead-center and the switch is snapped into its closed position. This will close the circuit of the winding-motor, which will run until the spring G is wound to a point where the spring $Q^3$ raises the arm to which it is attached and causes the switch to open by moving the spring $Q^2$ over the dead-center. The spring is wound by the motor L, when its circuit is closed from the inside. The arrangement of parts is such that when the motor starts into operation the gear I is rotated through the pinion L' in a direction to wind the spring, and the ratchet and pawl $I^2$ prevent the motor from affecting the position of the cylinder.

Since the motor L will invariably be in action at the same time as the cylinder it follows that at times the motor is directly assisting the spring. This occurs when the movement of the gear I, due to the spring, is such that it coincides with the movement imparted to it by the gear $I^3$ and in no way interferes with the operation of the controller.

Keyed to the upper end of the controller-shaft is an arm R, carrying at its outer end a spring-pressed contact R', which is adapted to engage the fixed contacts $1^a$ to $13^a$, inclusive. These contacts are arranged in the form of a circle and are carried by suitable brackets secured to the sides C' of the casing. As the arm R moves around it establishes electrical connection with the various fixed contacts and assists in the starting and stopping of the cylinder, as will be shown hereinafter. Mounted on the shaft, but insulated therefrom, is a ring $R^2$, by means of which current is carried to and from the moving arm.

In the upper right-hand corner of the controller-casing C is mounted a master reversing-switch S, arranged to control the action of the motor-reversing switch.

Figure 5:
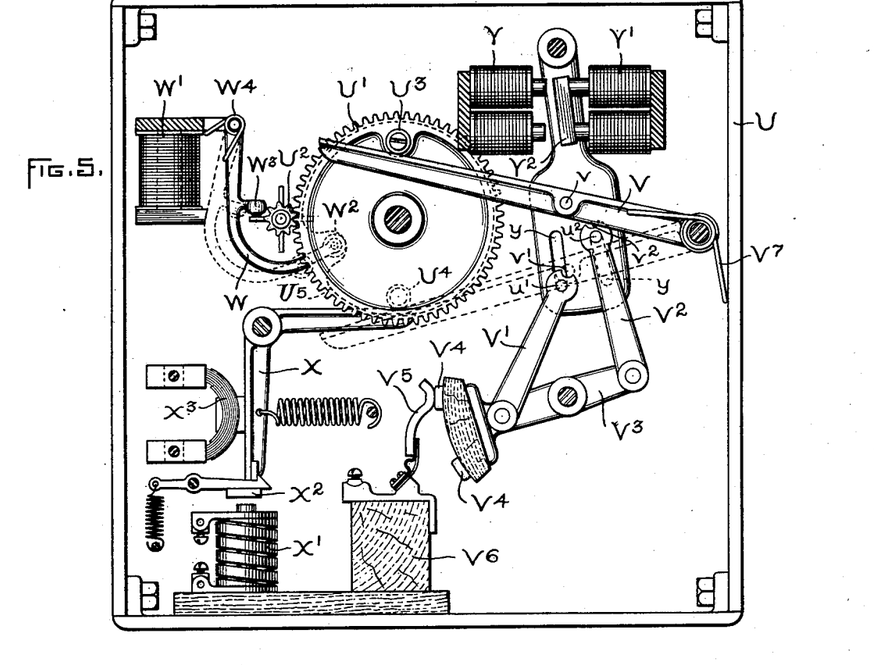
Fig. 5 is a plan view of the motor-reversing switch.

The mechanical construction of the reversing-switch for the propelling-motors is shown in Fig. 5. Mounted for rotary movement within the casing U is a gear U', and meshing with the gear is a pinion $U^2$, arranged to drive the armed wheel or escapement $U^3$. To simplify the drawings, I have omitted the means employed to drive the gear; but any suitable means may be employed for this purpose, as an electric or spring motor or combination of both, as shown in Fig. 1. The gear and operating mechanism are somewhat simpler than the one previously described, as the gear is only required to move in one direction. Pivotally secured at one side of the casing is a spring-pressed arm V, carrying a pin $v$, which is arranged to engage with the notches $v'$ and $v^2$ in the ends of the links V' and $V^2$. The arm V is normally held in the position shown by the spiral spring $V^7$ and is moved downward to a point where it will actuate the levers V' and $V^2$ by the roller $U^3$, mounted on the gear U'. The links V' and $V^2$ are pivotally secured to the lever $V^3$ and carried by the outer end of the lever; but insulated therefrom are the reversing-switch contacts $V^4$. The fixed brushes $V^5$ for engaging with the moving contacts $V^4$ are mounted on a suitable block of insulation $V^6$. On the under side of the gear is a flange $U^5$, (shown in dotted lines,) and this flange is provided with a depression for receiving the roller $W^2$, mounted on the end of the spring-pressed arm $W$. The spring-pressed arm in addition to acting as a stop for the gear also regulates the action of the escapement-wheel $U^2$ by reason of the boss $W^3$ engaging with the arms of the wheel. The arm $W$ is arranged to form the armature of the magnet $W'$, and when this magnet is energized the arm is withdrawn from the depression in the flange and also from engagement with the escapement-wheel $U^2$.

At the lower left-hand corner of the casing is placed a circuit-breaker comprising a magnet-coil $X'$ and an armature $X^2$, the said armature controlling the action of the laminated contact $X^3$. The laminated contact is carried by a bell-crank lever $X$, which is held in its closed position by the armature $X^2$. The stud which carries the roller $U^3$ extends through the gear, and mounted thereon is a roller $U^4$. This roller is intended to close the circuit-breaker by engaging the bell-crank lever $X$ and forcing it downward. I have indicated the roller $U^4$ in its dotted-line position, and it will be seen that it rests upon the top of the lever $X$.

Situated in the upper right-hand corner of the casing are two electromagnets $Y$ and $Y'$, and pivotally supported between these magnets is an armature $Y^2$. The armature is formed with an extension, and in this extension are slots $y$, acting as guides for the pins $u'$ and $u^2$.

Figure 5A:
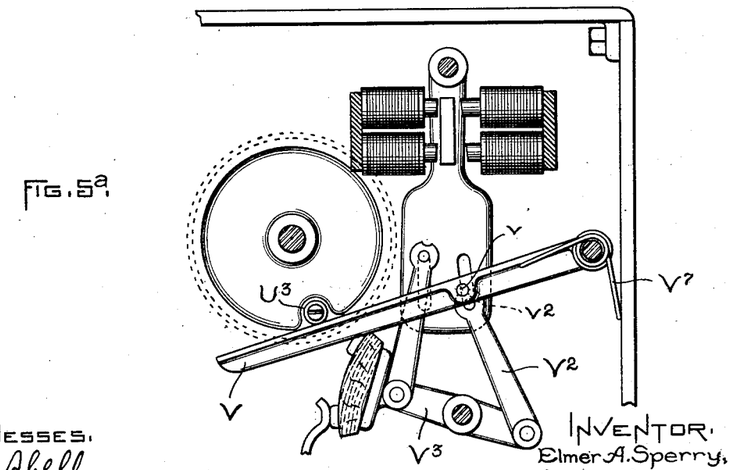

Assuming that it is desired to actuate the reversing-switch, the coils $Y$ and $W'$ are momentarily energized by moving the handle $S'$, Fig. 1. This causes the armature extension to be moved to the position shown in Fig. $5^a$ and the lever $W$ to be brought to the position shown in dotted lines in Fig. 5, and the gear begins to rotate. This causes the roller $U^3$ to depress the lever $V$, and the pin $v$ will engage with the notch $v^2$, causing the link $V^2$ to force the right-hand end of the lever $V^3$ down, and the contacts $V^4$, carried at the lower end of the lever, will be moved into engagement with the fixed brushes $V^5$. The arm $V$ will be returned by means of the spiral spring $V^7$ as the gear continues to rotate, and as soon as the depression in the flange formed in the back of the gear arrives opposite the roller $W^2$ the arm $W$, due to the deënergizing of the magnet $W'$, will move toward the right under the action of the spring $W^4$, the projection or boss $W^3$ will intercept the arms of the escapement-wheel $U^2$, and the gear will come to a standstill.

If for any reason the circuit-breaker opens, it can readily be reset by momentarily energizing the magnet-coil $W'$. This will start the gear $U'$ into operation, but will not change the position of the reversing-switch, and as soon as the roller $U^4$ moves the lever $X$ to the position shown it will be locked by the armature $X^2$.

The mechanical action of the motor-controller will now be described. Since the cylinder $B$ is arranged to establish certain connections when moved in one direction from a central position and certain other connections when moved in the opposite direction, and since the propelling force is a spiral spring capable of transmitting motion to the cylinder from either end, the direction of motion imparted by one end being the reverse of that imparted by the other, to actuate the controller in one direction means that it is necessary to hold the inner end of the spring and to permit the outer end to travel, and to actuate the controller in the opposite direction means that it is necessary to hold the outer end of the spring and to permit the inner end to travel.

Figure 3:
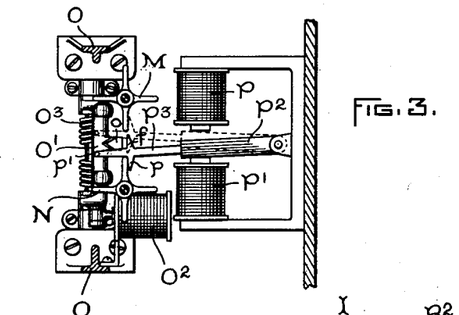
Fig. 3 is a section taken on line 3 3 of Fig. 1.

Assuming that it is desired to move the controller-cylinder in a clockwise direction, the circuit through the coils $P$, $P'$, and $O^2$ is momentarily closed in a direction to cause the armature $P^2$ to assume the position shown in Fig. 3. As soon as the circuit is interrupted the pivoted lever $O'$ releases the escapement-wheels $N$ $M$, but the escapement-wheel $N$ is prevented from turning by the projection $p$ of the extension $P^3$. With the parts as described the outer end of the spring-motor $G$ is held against movement by the escapement-wheel $N$, but the inner end is free to move. As the spring unwinds, motion is transmitted to the gear $I$, thence through the ratchet and pawl $I^2$ and hub $J'$ to the gears $J$ and $J^2$. As the escapement-wheel $M$ is free, the gears $J$ and $J$ begin to rotate and motion is transmitted to the arm $K'$ through the pinion $K$. The bevel-gear $H^2$ being stationary, it acts as a rack for the pinion, and as the latter moves over the gear while turning under the action of the bevel-gear $J^2$ the angular movement given to the arm $K'$ is in the same direction, but only half the amount of that of the gears $J$ and $J^2$. So long as the escapement-wheel is free to turn the cylinder will move under the action of the arm $K'$; but as soon as current is permitted to flow through the magnets $P$, $P'$, and $O^2$ the arm $O'$ is attracted, which intercepts the arms of the escapement-wheels and prevents further rotation. It is evident that the opening and closing of the circuit through the coils can be so timed that the controller-cylinder will move any desired amount and establish certain circuit relations.

Assuming that it is desired to operate the cylinder in the reverse direction, the inner end of the spring-motor $G$ is secured against rotation by locking the escapement-wheel $M$. This permits the outer end of the spring to travel in an anticlockwise direction and motion is transmitted directly to the gears H and H², thence to the pinion K, arm K', and to the cylinder. The spring-motor will continue to run until its movement is arrested by stopping the escapement-wheel.

From the above description it will be seen that the controller-cylinder can be actuated either forward or back from a central position, and while I prefer to use the cylinder to establish power connections when moved in one direction and brake connections in the other the arrangement may be modified to give a forward or backward rotation of the propelling-motors or any other connections desired.

Figure 6:
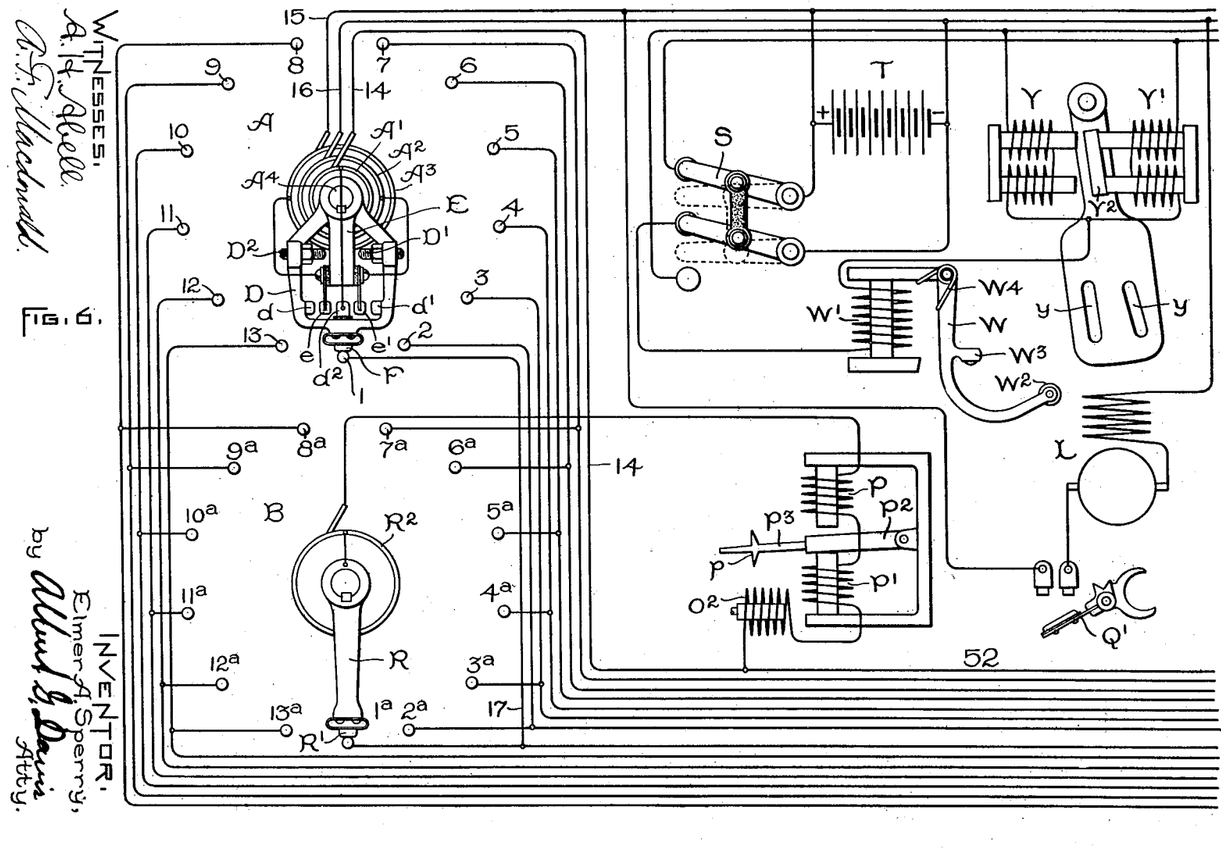
Fig. 6 is a diagram of the circuits of the master-controller.

Referring to Figs. 6, 7, and 8, the circuit connections will be described. For convenience the circuits of the master-controller will be considered separate from those of the motor-controller. In Fig. 8 I have shown a three-car train, each car being provided with a current-collecting device 50, which makes contact with a conductor 51. This conductor may, for example, be an overhead trolley-wire, a third-rail conductor, or a sectional conductor. Extending through each car on the train is a cable 52. The ends of the cable are provided with suitable connecting devices 53, so arranged that when connected like conductors are united. Each car is provided with one or more motors 54 and an electric braking device 55. As shown, the motor is mounted on one axle and the braking-magnet or braking device on another axle. This arrangement is preferable, as it distributes the braking effect over the car. The master-controllers A and the motor-controllers B are connected to the cable 52 in multiple. As shown, each car is provided with two master and two motor controllers, located on the front and rear platforms, respectively. This is a preferred arrangement, as it permits a car to be operated as a single unit either from the front or rear platform and at the same time permits it to be joined with other cars to form a train and the controlling accomplished from any point on the train.

When the parts are at rest and the master-controller is in its off position, the frame D, which is loose upon the controller-shaft A⁴, will occupy such a position that the contacts $e$ and $e'$, Fig. 6, upon the arm E of the controller will rest either upon the contacts $d$ and $d^2$ or $d^2$ and $d'$, and the circuit of the battery T will be closed through the windings P and P' and O², causing one of the lugs on the arm P² to engage with one or the other of the armed escapement-wheels N and M and holding the U-shaped lever O' in engagement with both of said escapement-wheels.

Assuming that the master-controller has been brought to the off position from some one of the positions 8 to 13, the contacts $e$ and $e'$ will rest upon the contacts $d^2$ and $d'$ and the circuit will be as follows: from the positive terminal of battery T by the wire 15 to the contact-ring A³, to the contact $e$, to the contact $d^2$, to the contact-ring A' by wire 14, through the coils O², P', and P to the contact-ring R², through the arm R, to contact R', to contact 1ª by wire 17, to contact 1, to contact F, to contact $d'$, to contact $e'$, to contact-ring A², and by wire 16 to the negative terminal of the battery. The magnets P and P' are energized in a direction to hold the armature P² up, and the projection $f$ engages with the arms of the escapement-wheel M, and the pivoted lever O' is held in engagement with both escapement-wheels by the solenoid O².

If now it is desired to start the train, the shaft of the master-controller is turned to the left, causing the arm E, keyed thereto, to carry with it the frame D through the engagement of the arm E with the set-screw D² until the contact F rests upon the contact 13. The initial movement of the arm E separates the contacts $e$ and $e'$ from the contacts $d^2$ and $d'$ (this being the position of parts shown in Fig. 6) and brings the former into contact with $d$ and $d^2$. This change in connections reverses the direction of current-flow through the magnet-coils P, P', and O² and causes the armature P² to move downward and the projection $p$ to engage with the arms of the escapement-wheel N. As soon as the contact F leaves the contact 1 the circuit through the magnet-coil O² is broken, thus permitting the pivoted lever O' to withdraw from engagement with the escapement-wheels N and M, the armature P² being held in its down position by the projection $o$ on the lever O'. The escapement is then free to revolve, and the spring-motor G starts into operation and unwinds from the inner end and the arm R of the motor-controller travels until the contact R' carried thereby reaches the fixed contact 13ª. As soon as this occurs the circuit is again established through the coil O² and the pivoted lever O is brought into engagement with the escapement-wheel M. To continue the movement in this direction, the master-controller is advanced step by step and the motor-controller will follow.

Assuming that the parts are at rest in the position just described—namely, with the contact F of the master-controller resting on contact 13 and the contact R' of the motor-controller resting on the contact 13ª—and that it is desired to move the motor-controller in the opposite direction to that previously described, the arm E of the master-controller is moved in the opposite direction, bringing the contacts $e$ and $e'$ into engagement with the contacts $d^2$ and $d'$ on the frame D, and the circuit is as follows: from the positive side of the storage battery T by wire 15 to contact-ring A³, to contact $e$, to contact $d^2$, to contact-ring A', by wire 14 to coil O² of the governing device, thence through the coils P' and P in series to ring R² on the master-controller, thence through the arm R, the spring-pressed contact R⁷, to contact 13ª, to contact 13, to contact F, to contact $d'$, to contact $e'$, to ring A², by wire 16 to the negative side of the battery. This will cause the armature $P^2$ of the governing device to be attracted, and as soon as the frame D, with its contact F, is moved off of the contact 13 by means of the handle $A^5$ the circuit of the solenoid-magnet $O^2$ will be interrupted. This permits the spring $O^3$ to withdraw the pivoted lever O' from engagement with the escapement-wheels. The escapement-wheel M being retained by the projection $f$ is held against rotation, but the wheel N being free to rotate the controller is started into operation and continues so until the contact R' of the motor-controller rests on the contact $1^a$. The master-controller contact F having been previously advanced to contact 1, as soon as the contact R' arrives at contact $1^a$ a circuit is established which energizes the coil $O^2$ and the pivoted lever O' is brought into engagement with the escapement-wheels and further movement of the controller is prevented. To advance the motor-controller in the same direction, the master-controller is moved forward until the contact F rests on the fixed contact 2. As soon as this is done the motor-controller will start into operation and run until the contact R' rests on fixed contact $2^a$, which completes the circuit of the coil $O^2$ and stops further movement of the cylinder, as before. It will be seen that by this arrangement the position of the operating-handle of the master-controller indicates the position of the cylinder of the motor-controller—that is to say, the angular movement of the master and motor controllers is the same. This is not a necessary arrangement, but a desirable one, for it indicates to the motorman the position of the motor-controllers. By this arrangement it will be seen that all of the motor-controllers which are connected to the cable 52 in multiple will be advanced in a step-by-step manner and in synchronism with the master-controller. For the purpose of illustration it has been considered that the master-controller is located on the front platform of the first car in the train; but, if desired, this switch may be located at any convenient point on the first car or upon any other car of the train and the control effected from that point.

The master-reversing switch S normally stands at the off position, and when it is desired to operate the motor-reversing switch the fingers of the switch S are moved into engagement with either the upper or lower contacts, and a circuit is created from the positive side of the storage battery T through the coil Y or Y' and the coil W' to the negative side of the battery. After the switch-energizing coils have been energized long enough to permit the starting of the gear U' (shown in Fig. 5) the circuit is interrupted, and as soon as the depression in the flange on the back of the gear arrives opposite the roller on the spring-arm W the lug $W^3$ intercepts the arm of the escapement-wheel $W^3$ and further movement of the gear is prevented.

The motor L for winding the spring G is series-wound and is connected from the positive to the negative side of the battery T through the snap-switch Q'. By using the storage battery T in the manner described it will be seen that the controllers may be operated in either direction from a central position whether current is being supplied to the cars by the conductor 51 or not. This is a very important feature, for without that it might happen that the motor-controllers on the various cars were at their full-speed position when the circuit-breakers at the station opened, and if the circuit at the station was reestablished after the motors had come to a standstill, or practically so, the shock to the motors caused by supplying them with maximum current at full potential would be extremely liable to injure them.

Referring to Fig. 7, the circuits of the motor-controller will be described. As arranged, the contacts situated on the right of the vertical row of fixed brushes are intended to establish the power-circuit relations of the motors and the contacts on the left to establish the braking connections of the motors.

Assuming that the contacts on the right have been advanced to a point where the brushes rest upon the line 1 1, the circuit will be as follows: from the supply-conductor 51 through the contact device 50, through the laminated contacts $X^3$ of the circuit-breaker, through the coil X' to the wire 56, to the brush $56^a$, thence to the contact on the cylinder and by cross connection to the brush 57, thence to all the sections of resistance 58 to the brush $58^a$, thence by cross-connected contacts on the cylinder to brush 59 to brush $59^a$, thence by cross-connected contacts to brush 60 to brush $60^a$ on the reversing-switch, and, assuming that the contacts on the right are in circuit with the brushes, to the contact 61, through the armature of motor 54 to the wire 62 to the brush $62^a$, thence by the contact on the reversing-switch to the brush 63, to the brush $63^a$ on the motor-controller, and by cross-connected contacts on the cylinder to brush 64, thence through the field of motor 54 to ground. With the circuits as described, each motor on the train is connected in series with a resistance between the source of supply and ground. The conductor 56 extends throughout the train and the collectors 50 on the several cars are connected in multiple therewith. By this arrangement I am enabled to preserve the current-supply to the motors on the various cars under all running-conditions, for if the collecting device of one car is momentarily insulated or establishes a poor connection with the supply-conductor current will be supplied to the motors on that car by means of the other collecting devices on the train.

If it is desired to increase the speed of the train, the contact-cylinders are advanced step by step in the manner previously described, which cuts out one section after another of the resistance 58 until finally each motor is connected directly between the source of supply and the ground.

For the purpose of retarding the train when it is desired to stop I convert the motors commonly employed for propelling purposes into generators and supply the current thus generated to the brake-shoes 55.

Assuming that it is desired to brake the train, the master-controller is moved to a point where it causes the motor-controller to move in the opposite direction to that previously described, and assuming that the contact-cylinder has moved to a point where the vertical row of brushes rests on the line $a\,a$ the circuit is as follows: from the positive brush of the motor 54 to brush 61, thence by contact on the reversing-switch to brush $60^a$, to brush 60, thence by cross-connected contacts on the cylinder to brush 64, through the field of the motor 54 to ground, thence to the ground connection of the contact-shoe 55, through the shoe to the wire 65, to the brush $65^a$, thence through the cross-connected contacts on the cylinder to brush 57, thence through all the sections of resistance 58 to brush $58^a$, thence by cross-connected contacts to brush 59, to brush $59^a$, by cross-connected contacts to brush $63^a$, to brush 63 on the reversing-switch, by contact on the reversing-switch to brush $62^a$, and thence to the negative brush of the armature of motor 54.

The contacts on the lower portion of the left-hand side of the cylinder are reversed relative to those on the right. This is to reverse the direction of current flowing through the armature at the time the motor is converted into a generator for braking purposes. By reversing the relation of the field and armature connections on the cylinder I avoid the necessity of shifting the main motor-reversing switch.

With the circuits arranged as described the motors have been converted into generators and are supplying current to the brake-magnets of the train. To increase the pressure of the brakes, one section after another of the resistance 58 is cut out of circuit. To return the controller to the off position, the reverse of the operation above described is employed.

It will be obvious that any preferred form of motor-controller may be adapted for use with my invention.

What I claim as new, and desire to secure by Letters Patent of the United States, is—

1. The combination of a vehicle, a motor mounted thereon, a controller for regulating the motor, a spring-motor for driving the controller forward and back, and means for winding the spring.

2. The combination of a vehicle, a motor mounted thereon, a controller for regulating the motor, and a spring for driving the controller both forward and back in a step-by-step manner.

3. The combination of a motor, a controller therefor, a spring-motor for actuating the controller both forward and back, and means for winding the spring.

4. The combination of a motor, a controller therefor, and a spring-motor for actuating the controller both forward and back, arranged to unwind from both ends.

5. The combination of a vehicle, a motor mounted thereon, a controller for regulating the motor, a spring-motor for driving the controller both forward and back, and an electric motor for winding the spring.

6. The combination of a vehicle, a motor mounted thereon, a controller for regulating the motor, a spring-motor for driving the controller, an electric motor for winding the spring, and means for automatically starting the electric motor into operation.

7. The combination of a vehicle, a motor mounted thereon, a controller for regulating the motor, a spring-motor for driving the controller, an electric motor for winding the spring, and a means for controlling the electric motor, which is dependent upon the condition of the spring-motor.

8. The combination of a motor, a controller therefor, a spring-motor for actuating the controller, arranged to unwind from both ends, and means for securing one end of the spring while the other end unwinds.

9. The combination of a motor, a controller therefor, a spring-motor for actuating the controller, and means for stopping the spring-motor at predetermined times corresponding with the steps on the controller.

10. The combination of a motor, a controller therefor, a spring-motor for actuating the controller arranged to unwind from both ends, and means for stopping the spring-motor at predetermined times corresponding with the steps on the controller, irrespective of the unwinding of the spring.

11. The combination of a vehicle, a propelling-motor, a spring-driven controller for starting, stopping and controlling the motor, having a number of running points, and a master-controller for regulating the motor-controller, which has a number of running positions corresponding to that of the motor-controller.

12. In a system of control, the combination of a number of vehicles mechanically united, motors mounted on certain of the vehicles and arranged to drive the vehicles as a common load, a spring-driven controller for each motor-car, and a master-controller capable of regulating all of the motor-controllers.

13. In a system of control, the combination of a number of vehicles mechanically united, motors mounted on certain of the vehicles and arranged to drive the vehicles as a common load, a spring-driven motor-controller for each motor-car, a master-controller for regulating the motor-controllers, and a cable extending through the vehicle, to which the master-controller is connected, the said cable being electrically separated from the motor-circuits.

14. In a system of control, the combination of a number of vehicles mechanically united, motors mounted on certain of the vehicles and arranged to drive the vehicles as a common load, a motor-controller for each motor-car, a spring-motor for driving the motor-controller, a master-controller for regulating the motor-controllers, connections for the motors, and connections for the master-controller which are electrically independent of the motor connections.

15. In a system of train control, the combination of a number of vehicles which are mechanically united, motors on two or more of the vehicles, a motor-controller for each vehicle having motors mounted thereon, a spring-motor for driving each motor-controller, and means uniting the motor-controllers in such a manner that they can be controlled from a single point.

16. The combination of a plurality of motor-cars united to form a train or a portion of a train, a controller on each motor-car, consisting of a double set of contacts arranged to establish connection with a single set of contacts, a spring-motor for actuating the double set of contacts, and a master-controller for establishing similar circuit connections with all of the motor-cars simultaneously.

17. In a train system, the combination with a number of cars provided with separate controllers, dynamo-electric machines controlled by said controllers for propelling the said cars, and for positively retarding the motion of said cars without absorbing energy from the line, a spring-motor for driving the motor-controllers forward and back, and means for simultaneously operating all of said controllers from a selected point.

18. In a train-control system, the combination with a plurality of sets of brakes and motors, of a plurality of controllers, each adapted to regulate one set of brakes and motors, a spring-motor for each motor-controller capable of driving it forward and backward, and means for simultaneously controlling the operation of all of the spring-motors from a selected point.

19. In a controller system, the combination of a master-controller, comprising a set of fixed contacts and a set of contacts movable with respect thereto, a master reversing-switch, a motor-controller comprising power and brake contacts, and a spring-motor controlled by the master-controller for regulating the action of the motor-controller.

20. In a system of control for electric motors, a motor-controller, a master-controller, a spring-motor for actuating said motor-controller, electromagnetic means for controlling said spring-motor, and circuits connecting the master-controller with the motor-controller through said electromagnetic controlling means.

21. In a system of control for electric motors, the combination of a motor-controller, means for actuating the controller, means for regulating the action of the controller, and electromagnetic means for controlling said regulating means.

22. In a system of control for electric motors, the combination of a motor-controller, means for actuating the controller forward and backward, and electromagnetic means for determining the direction of motion of the motor-controller.

23. The combination with an electric car and its motors, of a controller having a cylinder adapted to connect the motors for acceleration by its rotation in one direction, and to cause the retardation of the car by its rotation in another direction, and a spring arranged to move the controller in both directions.

24. The combination with a shaft, of means for actuating it in either direction, a pair of stops so arranged that both may be active or one may be released while the other is active, and means for controlling the action of the stops.

25. In a controller, the combination of a set of moving contacts, a motor for driving the contacts both forward and back, and an electrically-controlled escapement.

26. In a controller, the combination of a set of moving contacts, a motor for driving the contacts both forward and back, an escapement for regulating the forward movement of the contacts, a second escapement for regulating the backward movement of the contacts, and means for controlling the escapements.

27. The combination with a shaft, of a spring arranged to impart movement to the shaft, and means controlled by the expansion of said spring for automatically restoring energy to the spring after its effective strength has decreased by a certain amount.

28. The combination with a shaft, of a spring-motor arranged to drive the shaft, gearing loosely mounted on the shaft and connected to the motor, and means for transmitting motion from the gearing to the shaft.

29. The combination with a shaft, of a spring-motor arranged to drive the shaft, gearing loosely mounted on the shaft and connected to the motor, means for transmitting motion from the gearing to the shaft, and means for governing the speed at which the shaft travels.

30. The combination with a shaft of a spring-motor, a pair of gears loosely mounted on the shaft, means for holding one of the gears while the other is moving, and gearing between the said gears and the shaft, whereby the angular movement of the shaft is less than the angular movement of the pair of gears.

31. The combination with a shaft, of a spring-motor, a pair of gears loosely mounted on the shaft, means for holding one of the gears while the other is moving, a pinion arranged to mesh with both gears, and an arm for imparting movement to the shaft, which is secured to the pinion and the shaft, as set forth.

32. In a system of distance control for electric motors, the combination of a motor, a controller therefor, a pilot-motor for driving the motor-controller, a master-controller, and an escapement for controlling the movements of the pilot-motor, which is controlled by the master-controller.

33. In a system of distance control for electrically-actuated devices, the combination of a motor capable of movement in two directions, electromagnetically-actuated means for determining the direction of movement of the motor, and means for stopping the motor irrespective of its direction of movement.

34. In a system of distance control for electrically-actuated devices, the combination of a motor capable of movement in two directions, means for determining the direction of rotation of the motor, an escapement for regulating one movement of the motor, a second escapement for regulating the movement of the motor in the opposite direction, and means for stopping the escapements.

35. In a system of distance control for electrically-actuated devices, the combination of a motor capable of movement in two directions, electrically-actuated means for determining the direction of rotation of the motor, escapements for regulating the direction of movement of the motor, means for stopping the motor, and electrical means controllable from a distance for controlling the means employed to stop the motor.

36. In an electric switch, the combination of fixed and moving contacts, a magnet for determining the direction of movement of the contacts, a motor for actuating the switch, means for restraining said motor, and a magnet which controls said restraining means.

37. In an electric switch, the combination of fixed brushes, moving contacts adapted to engage therewith, links for moving the contacts, a lever for actuating the links, and means for determining which link will engage with the lever.

38. In an electric switch, the combination of fixed brushes, moving contacts adapted to engage therewith, links for moving the contacts, a lever for actuating the links, means for determining which link will engage with the lever, and a motor for moving the lever.

39. The combination of a switch, a circuit-breaker, a common means for actuating the switch and closing the breaker, a motor for operating said means, and an escapement controlling said motor.

40. The combination of a switch, a circuit-breaker, and a common means for actuating the switch and closing the breaker, so arranged that the switch may be closed without affecting the breaker or the breaker closed without affecting the switch.

41. The combination of an automatic circuit-breaker, a tripping-coil therefor, a switch, a motor for closing the circuit-breaker and switch, means for locking the circuit-breaker in place except on overload, and means for insuring the closing of the circuit-breaker each time the switch is actuated.

42. The combination of a spring-motor arranged to drive a given load, with means for rewinding the spring, comprising an electric motor, a circuit-closing device, and a lever actuated by the expansion of said spring for operating said circuit-closing device.

43. The combination of a spring-motor arranged to unwind from both ends, with means for rewinding the spring, comprising an electric motor the circuit of which is controlled by a switch that is controlled by the expansion of one of the turns of the spring.

44. In combination, a motor-controller, a motor for operating said controller, electromagnetic means for controlling the operation of said motor, a master-controller constructed and arranged to partially close a circuit for actuating said electromagnetic means, and means operated by the motor-controller for completing the said actuating-circuit whenever the motor-controller occupies a position corresponding to the position of the master-controller.

45. In combination, a motor-controller, a motor for operating said controller, electromagnetic means for controlling the operation of said motor, a master-controller, circuit connections for said electromagnetic means comprising a plurality of branch connections between said master and said motor controllers, the master-controller being constructed and arranged to open the circuit through one branch and partially close a circuit through another branch, and means operated by the motor-controller for completing the circuit through the latter branch whenever the motor-controller occupies a position corresponding to the position of the master-controller.

In witness whereof I have hereunto set my hand this 2d day of September, 1898.

ELMER A. SPERRY.

Witnesses:
BUDD GRAY,
M. C. PRENDERGAST.